United States Patent
Lindblad et al.

(10) Patent No.: US 10,394,889 B1
(45) Date of Patent: Aug. 27, 2019

(54) APPARATUS AND METHOD FOR SUPPLYING PATH PROTECTED SEARCH RESULTS FROM A SEMI-STRUCTURED DOCUMENT DATABASE

(71) Applicant: MarkLogic Corporation, San Carlos, CA (US)

(72) Inventors: Christopher Lindblad, Moraga, CA (US); Haitao Wu, Fremont, CA (US)

(73) Assignee: MarkLogic Corporation, San Carlos, CA (US)

( * ) Notice: Subject to any disclaimer, the term of this patent is extended or adjusted under 35 U.S.C. 154(b) by 243 days.

(21) Appl. No.: 15/403,156

(22) Filed: Jan. 10, 2017

(51) Int. Cl.
  *G06F 16/81* (2019.01)
  *G06F 16/9035* (2019.01)
  *G06F 16/901* (2019.01)
  *G06F 16/832* (2019.01)

(52) U.S. Cl.
  CPC ............ *G06F 16/81* (2019.01); *G06F 16/832* (2019.01); *G06F 16/9027* (2019.01); *G06F 16/9035* (2019.01)

(58) Field of Classification Search
  CPC ......... G06F 17/30935; G06F 17/30911; G06F 17/30926; G06F 17/30908; G06F 16/8365; G06F 16/81
  See application file for complete search history.

(56) References Cited

U.S. PATENT DOCUMENTS

| | | | | |
|---|---|---|---|---|
| 6,044,373 A | * | 3/2000 | Gladney | G06F 17/3056 |
| 6,820,082 B1 | * | 11/2004 | Cook | G06F 21/6227 |
| | | | | 707/754 |
| 2002/0143940 A1 | * | 10/2002 | Chi | G06F 17/30864 |
| | | | | 709/225 |
| 2003/0196169 A1 | * | 10/2003 | Wittkotter | G06F 21/606 |
| | | | | 715/234 |
| 2004/0172387 A1 | * | 9/2004 | Dexter | G06F 17/30911 |
| 2004/0193607 A1 | * | 9/2004 | Kudo | G06F 21/6227 |
| 2005/0050010 A1 | * | 3/2005 | Linden | G06F 17/30595 |
| 2005/0076030 A1 | * | 4/2005 | Hada | G06F 17/30938 |
| 2006/0101320 A1 | * | 5/2006 | Dodds | G06F 17/30569 |
| | | | | 715/239 |
| 2008/0120321 A1 | * | 5/2008 | Liu | G06F 16/86 |
| 2008/0154893 A1 | * | 6/2008 | Ting | G06F 17/30938 |
| 2010/0169354 A1 | * | 7/2010 | Baby | G06F 16/81 |
| | | | | 707/765 |
| 2010/0185683 A1 | * | 7/2010 | Baby | G06F 16/81 |
| | | | | 707/803 |

(Continued)

OTHER PUBLICATIONS

Walmsley, Priscilla, functx:contains-word, Feb 26, 2007, Datypic, pp. 1-2 (Year: 2007).*

(Continued)

*Primary Examiner* — James Trujillo
*Assistant Examiner* — Michal Lawrence Bogacki
(74) *Attorney, Agent, or Firm* — Cooley LLP

(57) ABSTRACT

An apparatus has a processor and a memory connected to the processor. The memory stores instructions executed by the processor to traverse paths of a document with semi-structured data. For each path that is unprotected, a term at a terminating node of the path is added to an index as a query term. For each path that is protected, a term at a terminating node of the path is combined with a permission to form a combined query term that is added to the index.

6 Claims, 2 Drawing Sheets

(56) References Cited

U.S. PATENT DOCUMENTS

2014/0114994 A1* 4/2014 Lindblad .......... G06F 17/30545
707/756
2014/0304293 A1* 10/2014 Richey, Jr. ........ G06F 17/30575
707/769

OTHER PUBLICATIONS

Melton, J; Buxton, S, Querying XML, Apr. 2011, Morgan Kaufmann Publishers, Ch. 13 What's Missing, pp. 10-14, 24-26, 29-32 (Year: 2011).*
Amer-Yahia, S et al., TeXQuery: A Full-Text Search Extension to XQuery, Sep. 30, 2003, Cornell University, pp. 3-4, 8-21 (pdf pages) (Year: 2003).*
Case, P; Amer-Yahia, S; XQuery and XPath Full Text 1.0 Use Cases, Jan. 25, 2011, W3C, pp. 5-95 (Year: 2011).*
MongoDB Manual 3.2, "Collection-Level Access Control", https://docs.mongodb.com/v3.2/core/collection-level-access-control/, Oct. 26, 2016.
Luo et al., "QFilter: Fine-Grained Run-Time XML Access Control via NFA-based Query Rewriting", Pennsylvania State University, University Park, PA, Nov. 8-13, 2004.

* cited by examiner

APPARATUS AND METHOD FOR SUPPLYING PATH PROTECTED SEARCH RESULTS FROM A SEMI-STRUCTURED DOCUMENT DATABASE

FIELD OF THE INVENTION

This invention relates generally to database administration. More particularly, this invention relates to techniques for supplying path protected search results from a semi-structured document database.

BACKGROUND OF THE INVENTION

Semi-structured documents do not have a formal structure, but they do contain tags or other markers to separate semantic elements and enforce hierarchies of records and fields. Extensible Markup Language (XML) documents and JavaScript Object Notation (JSON) documents are examples of semi-structured documents.

While it is common for a document database to have access control at the document level, it is a challenge to implement access control at the node level within a document with a tree data model, such as XML and JSON. One solution is to maintain different copies of data for each user based upon each user's data access permissions. Such a solution can result in data proliferation when there are many users with different permissions.

Accordingly, there is a need for node level access control in a semi-structured document database.

SUMMARY OF THE INVENTION

An apparatus has a processor and a memory connected to the processor. The memory stores instructions executed by the processor to traverse paths of a document with semi-structured data. For each path that is unprotected, a term at a terminating node of the path is added to an index as a query term. For each path that is protected, a term at a terminating node of the path is combined with a permission to form a combined query term that is added to the index.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
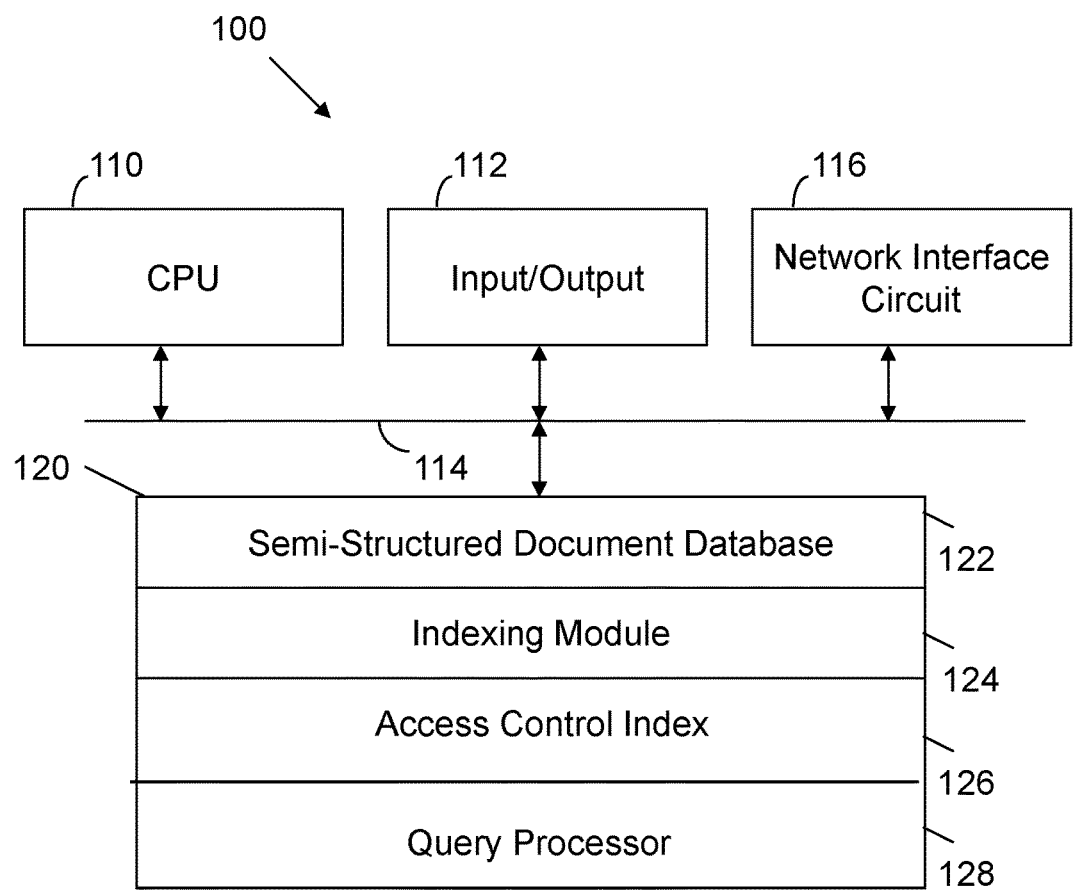
FIG. 1 illustrates a machine configured in accordance with an embodiment of the invention.

FIG. 1 illustrates a machine 100 configured in accordance with an embodiment of the invention. The machine 100 includes a central processing unit 110 connected to input/output devices 112 via a bus 114. The input/output devices 112 may include a keyboard, mouse, display and the like. A network interface circuit 116 is also connected to the bus 114. The network interface circuit 116 provides connectivity to a network, which may be any combination of wired and wireless networks. A memory 120 is also connected to the bus 114. The memory 120 stores a semi-structured document database 122. The semi-structured document database includes a collection of documents having semi-structured data. The term "document" as used herein is any type of semi-structured data segment.

The memory 120 also stores an indexing module 124. The indexing module 124 includes instructions executed by the central processing unit 110 to implement operations disclosed herein, including operations discussed in connection with FIG. 2. The indexing module 124 forms an access control index 126. The query processor 128 includes instructions executed by central processing unit 110 to process a query against the access control index to produce path protected search results, examples of which are supplied below.

Figure 2:
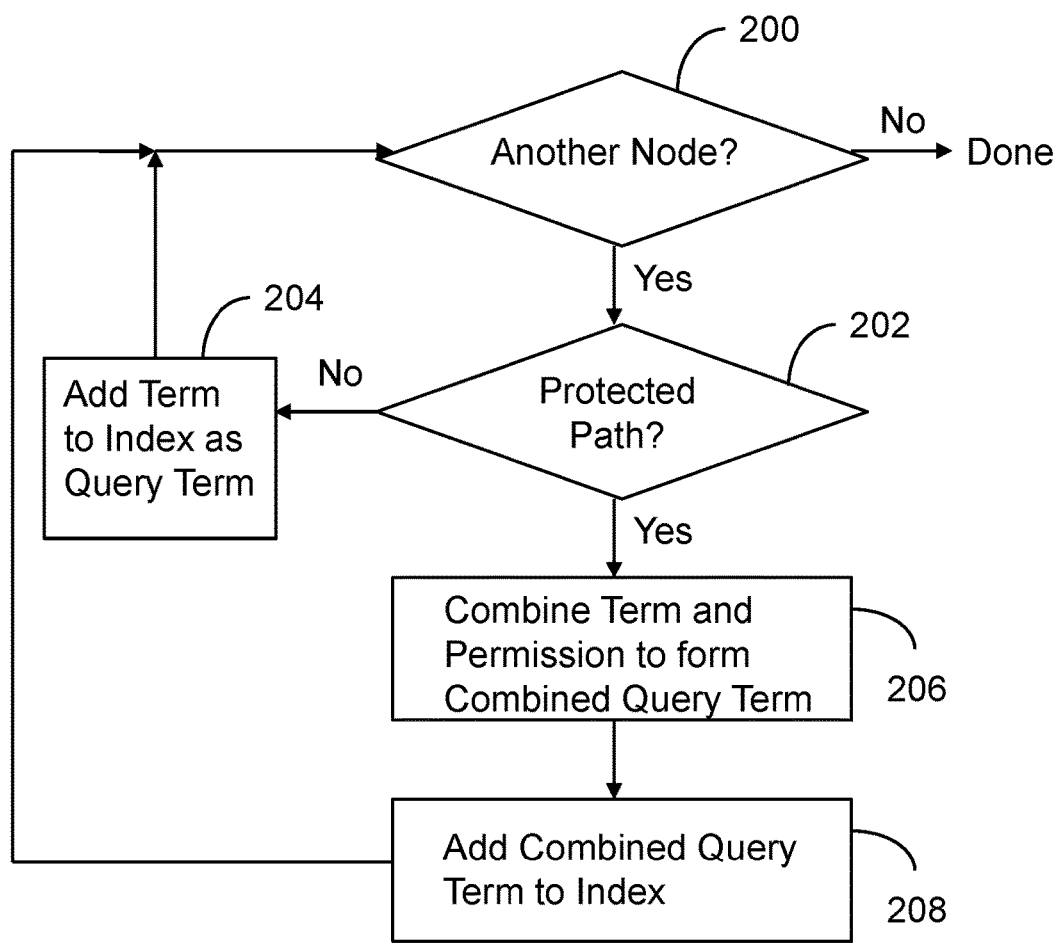
FIG. 2 illustrates processing operations associated with an indexing module utilized in accordance with an embodiment of the invention.

FIG. 2 illustrates processing operations associated with an embodiment of the invention. In particular, the figure illustrates operations associated with indexing module 124. The indexing module 124 produces entries in the access control index 126 for each document in the semi-structured document database 122. The indexing module 124 traverses paths of a document with semi-structured data. More particularly, each node of a tree data model of a semi-structured data document is traversed until no nodes remain (200—No). For each new node (200—Yes) it is determined whether the node is a protected path 202. A protected path is a path that terminates in a node with access restrictions. If a protected path does not exist (202—No), the term at the node is added to an index as a query term 204. If a protected path does exist (202—Yes), the term at the node is combined with a permission to form a combined query term 206. The combined query term is then added to the index 208. This approach avoids index expansion because each node is indexed with one set of permissions. That is, different versions of data need not be created for individuals with different permissions.

Consider the case of an employee record as follows:
<employee>
<name>Haitao Wu</name>
<address>Fremont, CA</address>
<salary>1000000</salary>
</employee>

Data access rules specify that anyone is allowed to see the "name", but only the "HR" role is allowed to see "address" and only the "Manager" role is allowed to see "salary". To model this, one defines the following two protected paths:
1) /employee/address ("HR", "read")
2) /employee/salary ("Manager", "read")

Each protected path has two parts: the first part is a path expression (e.g., an XPath expression) that specifies the nodes to be protected (i.e., a first path of /employee/address and a second path of /employee/salary); the second part is the permissions (i.e., a first permission ("HR","read") and a second permission ("Manager", "read")), which specifies who (which role) can access these nodes. This role based permission approach may be substituted with other permission models.

As discussed in connection with FIG. 2, when the indexing module 124 processes the above document, it walks through each node. When it encounters the node "address", it recognizes that it is protected by the first protected path. Therefore, it performs the operations of blocks 206 and 208 of FIG. 2. That is, instead of putting the word "Fremont" directly into the index, it combines the word and the permission from the protected path together into a combined query term that is placed in the index.

In one embodiment, the combined query term may be expressed as:

HASH_FUNC(word("Fremont"), role("HR"))

This approach is used when an index stores query terms as numbers (e.g., 64 bit numbers). In the example above, instead of putting words or roles as strings into the index, a unique 64 bit number for each unique query term is produced. Thus, the hash function is a way to "map" a string, a number or a list of numbers into one 64 bit number (query term). For example, in the example above, the string "Fremont" is mapped to a 64 bit number by the "word" function; role("HR") returns a 64 bit number that represents the HR role; then these two numbers are combined by HASH-FDNC into another 64 bit number, which is the query term that is placed into the index. Advantageously, the underlying operations for those functions are mostly bit operations (e.g., shifting, masking, XOR, etc). Alternate embodiments of the invention utilize term strings and role strings in the index.

In the context of the foregoing example, consider a simple word query on "Fremont". The query processor 128 expands the query based on the role of individual submitting the query. If the caller doesn't have the "HR" role, the above search essentially only looks for the word ("Fremont"). The query will return no results because the access control index does not have the simple word term for "Fremont". Rather, the index has a combined query term:

HASH_FUNC(word("Fremont"), role("HR")). On the other hand, if the individual submitting the query has the "HR" role, the simple search for "Fremont" will be expanded into an OR query:

word("Fremont") OR HASH_FUNC(word("Fremont"), role("HR"))

This will find the above document since the second part of the OR query is exactly the term the indexing module 124 put in the index 126 for this document.

Returning to the employee record example above, suppose that there is an extra requirement this time, which is to allow only a role called "Internal" to read any employee record (i.e., a user without the "Internal" role cannot even see any employee's name). This can be modeled as another protected path:

3) /employee ("Internal", "read")

We also assume that not all HR personnel have the "Internal" role. When the indexing module 124 inspects the "address" element, it sees that the node itself is protected by path (1) (i.e., /employee/address ("HR", "read")) and its parent (the "employee" element) is protected Path (3) (i.e., /employee ("Internal", "read")). Therefore, instead of putting the word "Fremont" directly into the index, it combines the word and the permissions from both protected paths together into one combined query term, which is placed in the access control index 126. The combined query term may be expressed as:

HASH_FUNC(word("Fremont"), ANOTHER_HASH_FUNC(role("HR"), role("Internal")))

On the query side, a query expansion of the type in the previous example occurs. The query processor 128 requires that a user has both the "HR" and "Internal" roles. The expanded query contains the expression listed above. That is, only a user that has both roles can find the document by running a word query on the word "Fremont".

Consider the case of multiple protected paths matching the same node. In this case, the semi-structured data is as follows:

<foo>
  <bar releasableTo="US" classification="unclassified">word1</bar>
  <bar releasableTo="US" classification="secret">word2</bar>
  <bar releasableTo="UK" classification="unclassified">word3</bar>
  <bar releasableTo="UK" classification="secret">word4</bar>
</foo>

This is an example where protection needs to be defined by attribute values. It is common to have multiple attributes with each covering one aspect of the data. In the above document, for example, "releasableTo" defines which country (modeled as roles) can read the data and "classification" defines which clearance level (also modeled as roles) the user must hold to access the data. The best way to model this type of protection is to use different protected paths for different attributes, such as the following:

//bar[@releasbleTo="US"] ("US", "read")
//bar[@releasbleTo="UK"] ("UK", "read")
//bar[@classification="unclassified"] ("unclassified", "read")
//bar[@classification="secret"] ("secret", "read")

This implies that an element may match multiple protected paths. A user must have all roles from all matching paths to access the node. With the above example, a word-query on "word2" can find the document only if the user holds both the "US" role and the "secret" role. The query term may be expressed as:

HASH_FUNC(word("word2"),ANOTHER_HASH_FUNC(role("US"), role("secret")))

The techniques of the invention can be used for more complex scenarios, such as multiple levels for parent/child and with each node on the path matching multiple paths. The permissions on a protected path can have multiple roles. For example, if one wants to allow both HR and Legal to see an employee's address, one can define Path (1) as /employee/address (("HR", "read"),("Legal","read"))

This means a user with either the HR role or the Legal role can see the address element in the employee record. The invention also supports fine-grained control for updates at a node (i.e., at an element level in XML, or property level in JSON).

In one embodiment, the semi-structured document database 122 stores original data. That is, it does not store different versions of a document for different users with different access permissions. Therefore, an access document has complete content. The content may need to be concealed based upon one or more permissions. In the example above with the employee record, a first path of /employee/address has a first permission ("HR", "read") and a second path of /employee/salary with a second permission ("Manager", "read"). A query for the word "Fremont" will find the document if the user submitting the query has the HR role. When the document is returned to the user, the "salary" element is concealed since the user does not have the "Manager" role. Therefore, the document returned is as follows.

<employee>
  <name>Haitao Wu</name>
  <address>Fremont, CA</address>
</employee>

On the other hand, if the query is issued by a user that has both the HR role and the Manager role, the query results in the entire document being returned.

The foregoing examples rely upon simple document structures. The techniques of the invention are applicable to more complex document structures. Relying upon the previous employee example document, the address field may have multiple terms, such as:

```
<employee>
<name>Haitao Wu</name>
<address>Woodbridge PL, Fremont, CA</address>
<salary>1000000</salary>
</employee>
```

Thus, for a protected path, multiple terms at a terminating node may be combined, such as:
HASH_FUNC(phrase("Woodbridge", "PL", "Fremont", "CA"), role ("HR")).

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a processor; and
a memory connected to the processor, the memory storing instructions executed by the processor to:
traverse paths of a document with semi-structured data,
for each path that is unprotected add a term at a terminating node of an unprotected path to an index as a query term and for each path that is protected combine the term at a terminating node of a protected path with a permission to form a combined query term that is added to the index;
wherein the memory stores the index and a semi-structured document database including a collection of documents having semi-structured data; and
wherein the memory stores a query processor with instructions executed by the processor to form from a received query an expanded query including a received search term and a permission associated with a user submitting the received query, the query processor comparing the expanded query to combined query terms in the index to block document access when the user does not have protected path permission and returning query results when the expanded query matches a combined query term in the index.

2. The apparatus of claim 1 wherein the collection of documents includes XML documents and JSON documents.

3. The apparatus of claim 1 wherein the permission is based upon a role of an individual.

4. The apparatus of claim 1 wherein a terminating node of a path is an XML element.

5. The apparatus of claim 1 wherein a terminating node of a path is a JSON property.

6. The apparatus of claim 1 wherein the instructions executed by the processor include instructions to combine the term at the terminating node of the protected path with a plurality of permissions to form the combined query term that is added to the index.

* * * * *